V. A. MILLEN.
STOCK WATERING DEVICE.
APPLICATION FILED SEPT. 12, 1916.
1,212,537.
Patented Jan. 16, 1917.
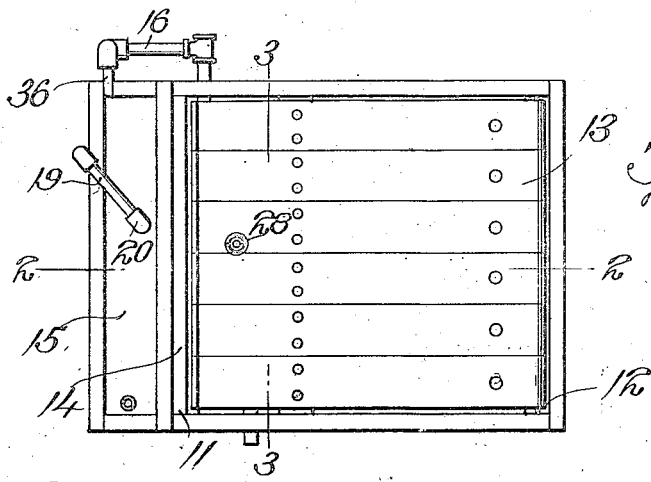
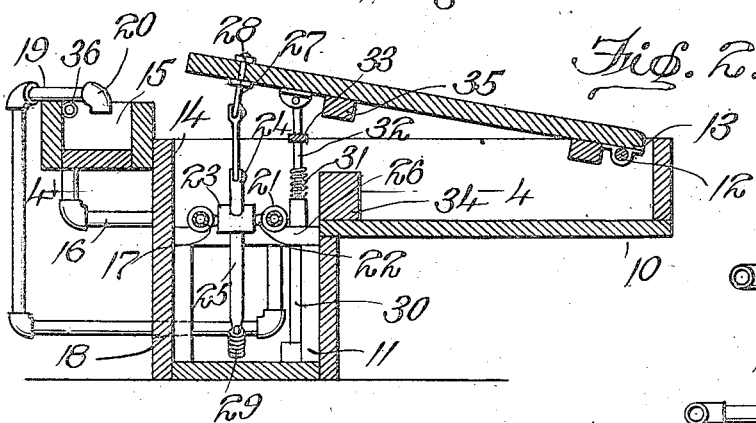
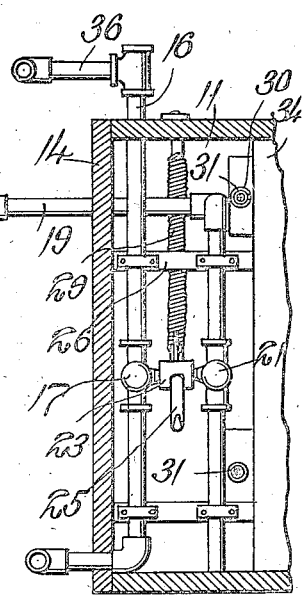
Inventor
V. A. Millen

UNITED STATES PATENT OFFICE.

VICTOR A. MILLEN, OF AKRON, OHIO.

STOCK-WATERING DEVICE.

1,212,537.  Specification of Letters Patent.  Patented Jan. 16, 1917.

Application filed September 12, 1916. Serial No. 119,731.

*To all whom it may concern:*

Be it known that I, VICTOR A. MILLEN, a citizen of the United States, residing at Akron, in the county of Summit and State of Ohio, have invented certain new and useful Improvements in Stock-Watering Devices; and I do hereby declare the following to be a full, clear, and exact description of the invention, such as will enable others skilled in the art to which it appertains to make and use the same.

This invention relates to improvements in stock watering devices.

One object of the invention is to provide a device of this character which is automatically operated by the weight of an animal and which is particularly adapted for preventing freezing of water in the watering trough in cold weather.

Another object is to provide novel means for operating an inlet valve and an outlet valve simultaneously, so that the trough will only contain water while an animal is on the operating platform.

Other objects and advantages will be apparent from the following description when taken in connection with the accompanying drawing.

In the drawing: Figure 1 is a plan view of my improved stock watering device; Fig. 2 is a longitudinal sectional view on the line 2—2 of Fig. 1; Fig. 3 is a transverse section on the line 3—3 of Fig. 1; Fig. 4 is a horizontal section on the line 4—4 of Fig. 2.

Referring particularly to the accompanying drawing, 10 represents the base or foundation of the device, which may be of any suitable construction, such as concrete, metal, wood or the like, and at one end there is formed a well 11 sunken in the ground, below the level of the base. Disposed over the base and pivotally mounted at the outer or rear end thereof as indicated at 12, is a platform 13, the free end of which is disposed over the well and normally lies adjacent the upper end of the wall 14 of the well. Adjacent this wall 14 is mounted a trough 15 from the bottom of which extends an outlet pipe 16, said pipe entering the well where it is provided with a rotary valve 17. A water pipe for conveying water to the trough, extends outwardly from the well and through an opening in the wall thereof, as shown at 18. The upper end of this pipe extends over the trough and is provided with a downwardly extending nozzle 20.

In the pipe 19 is an inlet valve 21, of the same type as the valve 17, and mounted on a common shaft 22 for simultaneous operation. Fixed on this shaft, and between the valves is a sleeve 23, having extended from opposite sides thereof crank arms 24 and 25. The crank arm 24 is loosely connected at its free end to a bolt 27 carried by the adjacent end of the platform 13, said bolt having adjusting nuts 28 thereon, above and below the platform. Connected to the free end of the crank arm 25 is one end of a coil spring 29, the lower end of said spring being secured to one wall of the well. Mounted in the well are vertically disposed cylinders 30 in which are disposed strong coil springs 31, and pivotally connected to the lower side of the platform 13 are plunger rods 32 having on their lower ends plunger heads 33 resting on the upper ends of the springs, and movable within the cylinders, as the platform rises and lowers. Secured to the upper side of the base 10 are blocks 34 which are adapted to be engaged by similar blocks 35, carried by the lower face of the platform 13.

The normal positions of the parts are as shown in Fig. 2, and when an animal steps onto the platform 13 the same will be depressed, against the tension of the springs 31. This downward movement of the platform serves to rotate the shaft 22 through the medium of the sleeve and crank arm 24 while at the same time the spring 29 is expanded. In normal position, the valve 17 is opened, and the valve 21 closed, but when the platform is depressed, and the shaft 22 rotated, the valve 17 will be turned to closed position, and the valve 21 to open position. The water will then flow through the pipe 19 into the trough, and be retained in the trough because of the closed position of the valve 17. After the animal has passed from the platform, the springs 31 will raise the same while the spring 29 will exert a pull upon the crank arm 25 to rotate the shaft 22 and restore the valve 17 to open position and the valve 21 to closed position. This cuts off the supply of water through the pipe 19, and permits the water in the trough to flow therefrom. Extending upwardly within the trough, and at a point just below the top of the trough is an overflow pipe 36 which permits of the water escaping should the animals stand on the platform too long. This will prevent overflowing of the trough, especially in case where the platform is big enough for several animals at a time.

What is claimed is:—

In a stock watering device, a trough, a water conduit for conveying water to the trough, a conduit for conveying water from the trough, a normally closed rotary valve in the first conduit, a normally open rotary valve in the second conduit, a stem extending between and connecting the valves for effecting simultaneous rotation thereof, a depressible platform, vertical hollow standards disposed below the platform, plunger rods carried by the platform and slidable vertically in the standards, collars on the rods, coil springs encircling the rods between the collars and the upper ends of the standards, crank arms carried by the said stem and extending radially therefrom in opposite directions, a link pivotally connected with the platform and to one of the crank arms, and a spring connected to the other crank arm and having its other end secured adjacent the standards.

In testimony whereof, I affix my signature, in the presence of two witnesses.

VICTOR A. MILLEN.

Witnesses:
S. P. CLARKE,
EDWARD E. SCHINTEMA.